United States Patent [19]

Koike et al.

[11] Patent Number: 5,099,255
[45] Date of Patent: Mar. 24, 1992

[54] RECORDING METHOD USING RECORDING LIQUID HAVING ORGANIC SOLVENT WITH PLURAL ($C_2H_4O$) MOIETIES

[75] Inventors: Shoji Koike; Kazuo Iwata, both of Yokohama; Shinichi Tochihara, Hiratsuka; Yasuko Tomida, Atsugi, all of Japan

[73] Assignee: Canon Kabushiki Kaisha, Tokyo, Japan

[21] Appl. No.: 478,580

[22] Filed: Feb. 7, 1990

Related U.S. Application Data

[60] Division of Ser. No. 168,593, Mar. 3, 1988, Pat. No. 4,923,515, which is a continuation of Ser. No. 891,596, Aug. 1, 1986, abandoned.

[30] Foreign Application Priority Data

Aug. 6, 1985 [JP] Japan ................................ 60-172734
Oct. 16, 1985 [JP] Japan ................................ 60-228922
Nov. 18, 1985 [JP] Japan ................................ 60-256768
Nov. 18, 1985 [JP] Japan ................................ 60-262559
Nov. 25, 1985 [JP] Japan ................................ 60-262560

[51] Int. Cl.$^5$ ........................................... B41J 2/05
[52] U.S. Cl. .............................................. 346/1.1
[58] Field of Search ............ 346/1.1, 135.1; 106/20, 106/22

[56] References Cited

U.S. PATENT DOCUMENTS 4,409,040 10/1983 Tabayashi et al. ............... 106/20
4,478,910 10/1984 Oshima et al. ................... 428/331
4,508,570 4/1985 Fujii et al. ........................ 106/20
4,923,515 5/1990 Koike et al. ...................... 106/22
4,965,612 10/1990 Sakaki et al. ..................... 346/1.1
4,975,117 12/1990 Tabayashi et al. ............... 106/22

OTHER PUBLICATIONS

Römpp, Chemie Lexikon, 1979 (8th Edition).
H. P. Fiedler, Lexikon der Hilfsstoffe für Pharmazie, Kosmetik und angrenzende Gebiete, 1981 (2nd Edition).
Ullmann's Enzyclopadie der Technischen Chemie, vol. 8, "Äthylenglykol", 1974.
vol. 23, "Tinten und andere Schreibflussigkeiten", 1981.
Firmenschrift Organische Chemikalien Hoechst Ethylenglykoldimethylether "Hoechst", 1986.
Chemie für Mediziner, 1977.
Louis F. Fieser und Mary Fieser, Organische Chemie, 1968.
von. Prof. Dr. Hans Beyer et al., Lehrbuch der organischen Chemie, 1981.

*Primary Examiner*—Benjamin R. Fuller
*Assistant Examiner*—Alrick Bobb
*Attorney, Agent, or Firm*—Fitzpatrick, Cella, Harper & Scinto

[57] ABSTRACT

A recording method using a recording liquid composition having at least water, a water-soluble dye and an organic solvent represented by formulae (I), (II), or (III):

$$R_1O-(C_2H_4O)_m-R_2 \quad (I)$$

$$HO-(C_2H_4O)_a(C_3H_6O)_b(C_2H_4O)_cH \quad (II)$$

$$(R_3)(R_4)PH-O-(C_2H_4O)_nH \quad (III)$$

9 Claims, No Drawings

5,099,255

RECORDING METHOD USING RECORDING LIQUID HAVING ORGANIC SOLVENT WITH PLURAL (C₂H₄O) MOIETIES

This application is a division of allowed application Ser. No. 168,593 filed Mar. 3, 1988, U.S. Pat. No. 4,923,515, which is a continuation of abandoned application Ser. No. 891,596 filed Aug. 1, 1986, now abandoned.

BACKGROUND OF THE INVENTION

1. Field of the Invention

This invention relates to a recording liquid to be used for various recording tools such as writing implements, printers, etc. (hereinafter called an ink), particularly an ink suitable for the ink jet recording system in which recording is performed by permitting liquid droplets to fly from an orifice of recording head and also to a recording method by use thereof.

2. Description of the Related Art

The ink jet recording system has the advantages of less noise generation during recording as well as easy adaptation to color recording and capability of giving recorded images of high resolution at high speed. In the ink jet recording system, solutions of various water-soluble dyes dissolved in water or mixtures of water with organic solvents have been used as the ink. In this case, the requisite characteristics of the ink to be used are physical values of viscosity, surface tension, etc., within appropriate ranges, high dissolving stability of the dissolved components, no clogging of minute orifices, capability of giving recorded images with sufficiently high density, no change in physical values or no precipitation of solid components during storage, etc. Further, in addition to the above characteristics, it is also required to have the properties such that recording may be performed without restriction with respect to the kind of recording medium, that the fixing speed may be great, that the recorded images may be excellent in light resistance, water resistance, and solvent resistance (particularly alcohol resistance), and also that recorded image with excellent resolution may be given.

In the prior art, as the colorant of the ink in the ink jet recording system, water-soluble dyes have been primarily employed o0 account of the liquid medium being aqueous and, by use of water-soluble dyes, many of the above basic requirements for the ink jet recording system have been satisfied. However, when water-soluble dyes are used, since these water-solubles are inherently inferior in light resistance, problems are frequently involved in light resistance of the recorded images. More specifically, when recorded images are exposed to the light from the light sources such as sun light, fluorescent lamp or projector, the recorded images may be extinguished, or become less readable, or the image may be faded during a prolonged term of storage. Accordingly, investigations have been made regarding the addition of various additives such as UV-absorbers or antioxidants for improvement of light resistance with the basic characteristics maintained as mentioned above for the ink for ink jet recording. Thereby, it has been expected to improve greatly light resistance of the recorded images by addition of such substances into an ink.

However, this kind of additive is inferior in solution stability in the liquid medium of ink particularly in solution stability in water, thus ensuing the problems that it precipitates as solid in the ink with lapse of time, or that it precipitates the dye by decomposing or isomerizing the dye, thereby causing generation of clogging of nozzles.

The ink jet recording method, although it has been said not to be particular as to paper and more easily adapted to plain paper as compared with other recording methods, is not yet satisfactory under the present condition. More specifically, when printing is effected on plain paper commonly used in offices other than the paper for ink jet recording, such as notebooks, reporting paper, copying paper, letter paper, etc., the printed ink will spread along the fibers of the paper, whereby dot shape becomes unstable to generate so called feathering and therefore fine ruled lines, fine letters or complicated chinese characters become frequently unclear and difficult to see.

Further, since the papers as mentioned above are subjected to the treatment called "sizing" so that feathering ma be retarded in letters written by a writing implement with the use of an aqueous ink for fountain pen, the ink cannot easily penetrate into the paper in the printing conducted when by an ink jet printer, resulting in poor drying characteristic at the printed portion, whereby there are involved the problems such that the printed letters are stained by smearing with the cover of the printer and that the ink is transferred to the hand when the printed matter is touched with a hand.

Accordingly, various improvements have been done for the purpose of improving feathering and drying characteristic of printed letters. For example, it has been attempted to make the pH of the ink alkaline or to add a large amount of a surfactant in the ink, etc. An ink having a pH of strongly alkaline is dangerous when the ink is touched with hands and also involves the drawbacks that it is not sometimes good in both feathering and drying characteristic for papers in which a certain kinds of sizing agents are employed. On the other hand, addition of a large amount of a surfactant causes such problems that feathering occurred remarkably depending on the paper, that the ink was not ejected but retracted from the orifice face depending on the conditions of the print head or contrariwise the whole orifice face was wetted to give no ejection of ink, etc.

Although various improvements other than those as described above have been hitherto attempted, under the present condition, no ink has been known which can solve all of the problems of aforesaid feathering and drying characteristic of printed letters.

SUMMARY OF THE INVENTION

Accordingly, a principal object of the present invention is to provide an ink improved in the above drawbacks and a recording method by use thereof, namely an ink excellent in solution stability of a water-soluble dye as the ink for various writing implements, printers, particularly for ink jet recording and also capable of giving images having excellent light resistance and a recording method by use thereof. Further, another object of the present invention is to provide an ink which can give an image of good printing quality and also has good drying characteristic, without feathering or deformation of letters when printed on ordinary plain paper, etc. used in offices and a recording recording method by use thereof.

According to an aspect of the present invention, there is provided a recording liquid, comprising at least water, an organic solvent and a water-soluble dye, said water-soluble dye having a solubility of 5 % by weight or less in said organic solvent.

According to another aspect of the present invention, there is provided a recording method which performs recording by attaching liquid droplets of a recording liquid onto a recording medium, said recording liquid comprising at least water, an organic solvent and a water-soluble dye, said water-soluble dye having a solubility of 5 % by weight or less in said organic solvent, said recording medium being subjected to sizing and having fibers exposed on the surface of the recording medium.

The above objects can be accomplished by the present invention as defined below.

DETAILED DESCRIPTION OF THE PREFERRED EMBODIMENTS

To describe in more detail about the present invention, it has been practiced in the art to add a high boiling and water-soluble organic solvent such as polyhydric alcohols, etc., to an ink containing a water-soluble dye, particularly an ink for ink jet recording, in order to prevent ejecting nozzles, etc. from clogging by drying. When recording is effected on highly sized paper and the like, due to low liquid absorption of the paper, less volatile organic solvent will remain on the paper even if the water in the ink may be rapidly evaporated, and so the dye remains in a dissolved state. Accordingly, there ensue the problems such that the head or fingers may be stained when touched with the printed paper and also that the printed letters may be disturbed.

On the other hand, in the case of a paper with low degree of sizing having fibers exposed on the surface such as the papers for office work, the organic solvent will similarly remain even if the water may be evaporated and also, since the dye is dissolved in the organic solvent, the dye solution will be spread along the fibers of the paper or into the voids between the fibers, whereby, etc., impairing the quality of printed letter.

Therefore, such an ink for ink jet recording may ideally contain a dye in dissolved state when residing within the instrument such as nozzles, etc., of the recording device, but will not easily give rise to feathering by precipitation of the dye in the ink from the ink medium, and various problems as mentioned above were expected to be solved by use of such an ink.

The present inventors have intensively studied in order to obtain such an ideal ink, and consequently found that by selecting and using an organic solvent which can dissolve sufficiently a dye in a mixture of water with an organic solvent and afford rapid precipitation of the dye when the ratio of water is lowered by evaporation of the water in the mixture on a recording medium, there occurs no staining of other parts contacted with the printed portion or disturbance of printed letters even when printed on a paper with high degree of sizing, because the dye in the ink can be rapidly precipitated by evaporation of the water in the ink, and also printing of high quality is possible on the paper with low degree of sizing as the result of rapid precipitation of the dye by similar evaporation of the solvent, whereby only the liquid medium is feathered into the paper without feathering of the dye.

Studies have been made about organic solvents which can give such preferable results as mentioned above, and it has been consequently found that the above preferable effect, namely the effect that the dye is maintained sufficiently under dissolved state before evaporation of the water (within recording instrument or nozzle) and the dye is readily precipitated by evaporation of water (on paper), can be exhibited when the solubility of a water-soluble dye in such an organic solvent is 5 % by weight or less, and more preferably 4.5 % by weight or less.

The water-soluble dye in the ink to be used in the present invention which first characterizes the present invention may be those which are known per se, including, for example, water-soluble dyes as represented by direct dyes, acidic dyes, basic dyes, reactive dyes, food grade dyes, etc. Examples of the dyes particularly preferable for the inks in the ink jet recording method and can satisfy the performances required such as color forming characteristic, sharpness, stability, light resistance and others may include direct dyes such as C.I. Direct Black 17, 19, 32, 51, 71, 108, 146, 154;

C.I. Direct Blue 6, 22, 25, 71, 86, 90, 106, 199;

C.I. Direct Red 1, 4, 17, 28, 83;

C.I. Direct Yellow 12, 24, 26, 86, 98, 142;

C.I. Direct Orange 34, 39, 44, 46, 60;

C.I. Direct Violet 47, 48;

C.I. Direct Brown 109;

C.I. Direct Green 59, and the like, acid dyes such as

C.I. Acid Black 2, 7, 24, 26, 31, 52, 63, 112,

C.I. Acid Blue 9, 22, 40, 59, 93, 102, 104, 113, 117, 120, 167, 229, 234;

C.I. Acid Red 1, 6, 32, 37, 51, 52, 80, 85, 87, 92, 94, 115, 180, 256, 317, 315;

C.I. Acid Yellow 11, 17, 23, 25, 29, 42, 61, 71;

C.I. Acid Orange 7, 19;

C.I. Acid Violet 49 and the like, and other dyes such as

C.I. Basic Black 2;

C.I. Basic Blue 1, 3, 5, 7, 9, 24, 25, 26, 28, 29;

C.I. Basic Red 1, 2, 9, 12, 13, 14, 37;

C.I. Basic Violet 7, 14, 27;

C.I. Food Black 1, 2 and the like.

The above examples of dyes are particularly preferred for the inks to be used in the present invention, and the dyes to be used are not limited to these dyes.

Such a water-soluble dye is used at a proportion generally of about 1 to 10 %, by weight more preferably to 5 % by weight in the ink.

The solvent to be used for the ink is a solvent mixture of water with an organic solvent. As the water, it is preferable to use deionized water instead of water in general containing various kinds of ions.

The organic solvent to be used in a mixture with water may preferably be one having a boiling point under normal pressure of 120 ° C or higher, as exemplified preferably by those represented by the formulae shown

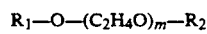

$$R_1-O-(C_2H_4O)_m-R_2 \qquad [I]$$

$$HO-(C_2H_4O)_a(C_3H_6O)_b(C_2H_4O)_cH \qquad [II]$$

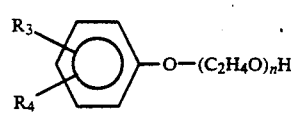

Typical examples of the compounds represented by the formula [I] are shown in Table 1.

TABLE 1

| No. | $R_1$ | m | $R_2$ |
|---|---|---|---|
| 1 | $CH_3$ | 3 | $C_2H_5$ |
| 2 | $C_2H_5$ | 3 | $C_2H_5$ |
| 3 | $C_3H_7$ | 3 | $C_3H_7$ |
| 4 | $C_4H_9$ | 3 | $CH_3$ |
| 5 | 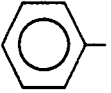 | 3 | $CH_3$ |
| 6 | $CH_3$ | 4 | $CH_3$ |
| 7 | $C_2H_5$ | 4 | $C_2H_5$ |
| 8 | $C_3H_7$ | 4 | $C_3H_7$ |
| 9 | $C_4H_9$ | 4 | $CH_3$ |
| 10 | $C_2H_5$ | 5 | $C_2H_5$ |
| 11 | $C_3H_7$ | 5 | $C_3H_7$ |
| 12 | $C_5H_{11}$ | 5 | $CH_3$ |
| 13 | $C_2H_5$ | 6 | $C_2H_5$ |
| 14 | $C_3H_7$ | 6 | $C_2H_5$ |
| 15 | $C_6H_{13}$ | 6 | $CH_3$ |
| 16 | $C_2H_5$ | 7 | $CH_3$ |
| 17 | $C_3H_7$ | 7 | $CH_3$ |
| 18 | 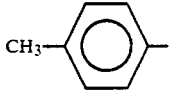 | 8 | $CH_3$ |
| 19 | $C_3H_7$ | 8 | $CH_3$ |
| 20 | $C_4H_9$ | 9 | $CH_3$ |
| 21 | $C_2H_5$ | 9 | $C_2H_5$ |
| 22 | $C_4H_9$ | 10 | $CH_3$ |
| 23 | $CH_3$ | 12 | $CH_3$ |
| 24 | $C_3H_7$ | 13 | $CH_3$ |
| 25 | 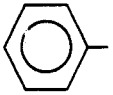 | 15 | $CH_3$ |
| 26 | $C_6H_{13}$ | 17 | $CH_3$ |
| 27 | $C_2H_5$ | 18 | $CH_3$ |
| 28 | $C_2H_5$ | 19 | $C_2H_5$ |
| 29 | $CH_3$ | 20 | $CH_3$ |

These compounds can be synthesized according to the known methods.

In the formula [I], $R_1$ and $R_2$ each independently represent an alkyl group having 1 to 6 carbon atoms or an aryl group having 8 or less carbon atoms, m is a positive integer, preferably 3 to 20.

Particularly when m is within the range of from 3 to 20, the compounds of the formula [I] have low vapor pressures, and hardly evaporated at around room temperature to produce no sensible odor.

On the other hand, if m is 2 or lower in the formula [I], these compounds have relatively good penetrating force into water and solubility in a solvent, but they have slightly higher vapor pressures to produce sensible odor.

Also, these compounds have no effect of preventing clogging at the orifice tip, but contrariwise frequently promote clogging. There is further the problem in hygiene of working environment.

On the other hand, when m is 21 or more, the viscosity of the ink will be markedly increased, whereby there is the problem that fixing speed cannot be improved.

In the formula [I], as the carbon chain of the alkyl group is longer, the effect of penetrating into paper becomes greater. However, if the carbon atoms in the alkyl group are 7 or more, feathering becomes extremely great similarly as in the case of a surfactant, and it has been further found that its solubility in an aqueous medium will be abruptly lowered with the length of the carbon chain.

Therefore, the alkyl group should preferably have 1 to 6 carbon atoms.

Also, the compound as a whole should preferably have 9 or more carbon atoms. The content of these compounds is limited from the balance between the fixing time of ink and feathering but the viscosity of the whole ink can be controlled by varying the length of m.

The compound of the formula [I], which is a diether, has more mild surface active ability as compared with monoethers, whereby feathering is hardly caused in the printed matter. Also, as compared with corresponding polyoxyethylene, it is higher in vapor pressure but lower in viscosity to be lowered in interface tension with paper, and therefore it has the effect of increased fixing speed of ink.

Next, the compounds represented by the formula [II] are block copolymers of ethylene oxide (EO) and propylene oxide (PO) of the $(EO)_a$-$(PO)_b$ type or $(EO)_a$-$(PO)_b$-$(EO)_c$ type, either of which can be obtained according to the methods known in the art.

Of the block copolymers as defined above, those which are useful for the object of the present invention are those in which a and c, namely the polymerization degree of EO is 78 or less, and b, namely the polymerization degree of PO is 2 or more and 15 or less.

The above block copolymers particularly preferred in the present invention are exemplified in terms of a, b and c as shown in Table 2.

TABLE 2

| No. | a | b | c |
|---|---|---|---|
| 1 | 3 | 2 | 1 |
| 2 | 4 | 3 | 0 |
| 3 | 6 | 3 | 0 |
| 4 | 5 | 3 | 1 |
| 5 | 2 | 4 | 0 |
| 6 | 4 | 4 | 4 |
| 7 | 6 | 4 | 2 |
| 8 | 8 | 4 | 0 |
| 9 | 18 | 4 | 2 |
| 10 | 4 | 5 | 0 |
| 11 | 8 | 5 | 2 |
| 12 | 9 | 5 | 1 |
| 13 | 8 | 6 | 4 |
| 14 | 10 | 6 | 2 |
| 15 | 12 | 7 | 2 |
| 16 | 3 | 8 | 0 |
| 17 | 6 | 8 | 2 |
| 18 | 7 | 8 | 1 |
| 19 | 10 | 8 | 6 |
| 20 | 12 | 8 | 4 |
| 21 | 14 | 8 | 2 |
| 22 | 39 | 8 | 2 |
| 23 | 16 | 9 | 2 |
| 24 | 19 | 10 | 1 |
| 25 | 20 | 11 | 2 |
| 26 | 11 | 12 | 1 |
| 27 | 20 | 12 | 4 |
| 28 | 22 | 12 | 2 |
| 29 | 20 | 14 | 8 |
| 30 | 15 | 15 | 15 |

In the compounds represented by the above formula, if the sum of a and c exceeds 78, in spite of good compatibility with water, the compounds represented by the above formula have too high molecular weights, whereby the viscosity of ink becomes too high and, in spite of little feathering during printing, the drying and fixing speed of ink is low and, as the ink or ink jet recording, discharging characteristic of ink or the shape of ink dot becomes unstable. The same is the case if b is too small and, while if b is too large there is the fear that compatibility with water and drying and fixing speed of ink may become insufficient.

As to the weight ratio of EO in the molecule of the compound represented by the above formula, EO should preferably comprise 20 to 80 % by weight based on the whole compound to accomplish best the object of the present invention.

The compound represented by the formula [III] is obtained by adding ethylene oxide to phenol or an alkyl phenol having 1 or 2 alkyl group having 1 to 2 carbon atoms, and the method for producing it per se may be similar to the method known in the art.

In the prior art, compounds prepared by adding ethylene oxides to alkyl phenols have been known as nonionic surfactants. However, such nonionic surfactants of the prior art have generally 8 to 12 carbon atoms in the alkyl group in order to control appropriately their HLB values. Such nonionic surfactants have been employed in the ink for ink jet of the prior art and exhibit the action enhancing apparent drying and fixing of ink, namely absorbability of ink into the recording medium. However, when the recording medium is a paper such as low sizing paper, excellent liquid absorbability will contrariwise cause troubles to give rise to excessive feathering of ink.

The present inventors have studied intensively about such feathering of the ink for ink jet, and consequently found that the problem of feathering of ink as mentioned above can be solved and also an ink capable of giving excellent drying and fixing characteristic of ink even for high sizing paper can be obtained by use of an ethylene oxide adduct of alkylphenol as described above, in which the alkyl group on the phenol is eliminated or the alkyl group, if any, is made to have 1 or 2 carbon atoms, as the moles of ethylene oxide added are made 4 to 20.

Typical examples of preferable compounds of the above formula [III] to be used in the present invention are as shown below.

TABLE 3

| Compound No. | $R_3$ | $R_4$ | n |
|---|---|---|---|
| 1 | Hydrogen atom | Hydrogen atom | 4 |
| 2 | " | " | 5 |
| 3 | " | " | 6 |
| 4 | " | " | 7 |
| 5 | " | " | 8 |
| 6 | " | " | 10 |
| 7 | " | " | 15 |
| 8 | " | " | 20 |
| 9 | p-methyl | " | 5 |
| 10 | " | " | 6 |
| 11 | " | " | 7 |
| 12 | " | " | 8 |
| 13 | " | " | 10 |
| 14 | " | " | 15 |
| 15 | p-ethyl | " | 6 |
| 16 | " | " | 8 |
| 17 | " | " | 10 |
| 18 | " | " | 12 |
| 19 | p-methyl | o-methyl | 6 |
| 20 | " | " | 8 |
| 21 | " | " | 10 |
| 22 | " | " | 12 |
| 23 | p-ethyl | " | 10 |
| 24 | " | " | 10 |

As contrasted to the compounds [III] to be used in the present invention as described above, in the case of medium to high alkyl groups such as nonyl, octyl, dodecyl groups as in the nonionic surfactants of the prior art, the ink which contains such a nonionic surfactant is excellent in absorbability, but, in the case of a low sizing paper such as plain papers in general, excessive feathering of ink occurs to impair the quality of printing to a great extent. It has also been proposed to use an example in which the alkyl group is made to have 3 to 4 carbon atoms from the balance between drying and fixing characteristic of ink and feathering. However, even with an alkyl group having such carbon atoms, the problem of feathering for plain papers, etc., cannot be sufficiently solved, and it is impossible to avoid lowering in quality of printing.

On the other hand, as for the moles of ethylene oxide added (n), if n is made 3 or less, in spite of excellent effect of increased penetrating force of ink, vapor pressure becomes higher to give less effect to preventing clogging within the nozzle of the ink jet recording device, and the compatibility with water becomes insufficient, whereby clogging of the nozzle may be sometimes recognized to be promoted. On the contrary, if n is 21 or more, the viscosity of ink is increased to make stable from the nozzle hardly achievable, and also the drying and fixing speed after printing will be very low. The amount of the compounds represented by the above formulae [I]-[III] as described above added in the ink is not particularly limited, but if the ratio of the compound represented by the above formulae in the ink is less than 0.5 % by weight, the drying and fixing speed of ink becomes insufficient, while if it exceeds 60 % by weight, the viscosity of the ink may be excessively increased, and excessive feathering of printed letters may occur or stability of the ink may be lowered. Thus, the compound represented by the above formulae should be contained in the ink preferably at a proportion of 0.5 to 60 wt.%, more preferably 0.5 to 30 wt.%.

Further, examples of water-soluble organic solvents which may be contained in combination with these compounds represented by the formulae [I]-[III] may include alkyl alcohols having 1 to 4 carbon atoms such as methyl alcohol, ethyl alcohol, n-propyl alcohol, isopropyl alcohol, n-butyl alcohol, sec-butyl alcohol, tert-butyl alcohol, isobutyl alcohol and the like; amides such as dimethylformamide, dimethylacetamide and the like; ketones or ketoalcohols such as acetone, diacetone alcohol and the like; ethers such as tetrahydrofuran, dioxane and the like; polyalkylene glycols such as polyethylene glycol, polypropylene glycol and the like; alkylene glycols having 2 to 6 carbon atoms such as ethylene glycol, propylene glycol, butylene glycol, triethylene glycol, 1,2,6-hexanetriol, thiodiglycol, hexylene glycol, diethylene glycol and the like; glycerin; lower alkyl ethers of polyhydric alcohols such as ethyleneglycol methyl (or ethyl) ether, diethyleneglycol methyl(or ethyl) ether, triethyleneglycol monomethyl(or ethyl) ether and the like; N-methyl-2-pyrrolidone, 1,3-dimethyl-2-imidazolidinone, triethanolamine, sulforane, etc. Of these water-soluble organic solvents, polyhydric alcohols such as diethleneglycol, lower alkyl ethers of polyhydric alcohols such as triethyleneglycol monomethyl(or ethyl) ether are preferred.

The content of the above water-soluble organic solvent in the ink may be generally 2 to 70 % by weight of the total weight of the ink, preferably 5 to 65 % by weight, and more preferably 10 to 60 % by weight.

The ink of the present invention can also 5 include, in addition to the above components, surfactants, viscosity controllers, surface tension controllers, etc., if necessary. Particularly, concerning surfactants, since such surfactants as employed in the prior art have great effect on feathering during printing, and therefore should not be used in a large amount for the object of the present invention and therefore their amounts should be limited to, for example, 0.5 % by weight or lower in the ink, preferably 0.4 % by weight or lower and, more preferably 0.3 % by weight or lower.

The ink to be used in the present invention comprises principally the above components, and the principal specific feature of the ink to be used in the present invention resides in that, in preparing the ink comprising the above components, the combination of the water-soluble dye used and the organic solvent used is made a specific combination and also that the mixing ratio of water and the organic solvent is made a specific ratio. More specifically, while any of the water-soluble dye and the organic solvent as described above are useful, it is required that a water-soluble dye should be selected so as to have a solubility of 5 % by weight or less in at least one of the organic solvents being uses and having preferably a boiling point of 120 ° C or higher and also it should be used in a restricted amount as specified above.

The solubility as herein mentioned of a water-soluble dye in an organic solvent refers to grams of the water-soluble dye dissolved in 100 g of the organic solvent under normal pressure at 25 ° C.

With such a specific feature, the ink to be used in the present invention is sufficiently in a dissolved state of the dye within the recording instrument or in the nozzle, and the water-soluble dye after recording comes out rapidly of the dissolved state with evaporation of water to lose its fluidity. As the result, the problems of poor drying or feathering of ink in various recording medium can be also solved, and recorded images of high quality and high resolution without feathering can be formed not only on ink jet recording paper specially prepared as a matter of course but also on plain papers in general.

The recording medium which can be used in the method of the present invention may include various paper for ink jet recording proposed in large number in the prior art or plastic sheets for OHP to enable excellent recording as a matter of course, or otherwise copying paper, reporting paper, bond paper, slip papers, continuous business forms, printing paper for computer may be all available, and the paper may be either low sizing papers or high sizing papers.

When a conventional ink, particularly an ink-jet printing ink is used for printing on a plain paper of a low sizing degree with the cellulose fiber exposed on the recording surface, the feathering of the print will be remarkable, making the high-quality printing impracticable. In contrast, in the method of the present invention, due to the effect of the ink as mentioned above, no feathering of ink occurs even on such a plain paper with low degree of sizing to give printing of high quality. Thus, the method of the present invention is still more suitable when employing such a paper with low degree of sizing.

The present invention is particularly useful as the ink jet recording method, and such an ink jet recording method may be of any system, provided that it is a system capable of imparting the ink onto a recording medium which is the object to be ejected against by releasing effectively the ink from a nozzle. Typical examples of such systems are described in, for example, IEEE Transactions on Industry Application, Vol. JA-13, No.1 (the February and March, 1977 issue) and the Feb. 19, 1976 issue, the Jan. 29, 1973 issue and the May 6, 1974 issue of Nikkei Electronics. The systems described in these reports are suitable for the present invention and, to explain some of them, there is first the electrostatic attracting system. This system includes the system in which recording is effected by giving a strong electrical field between a nozzle and an accelerating electrode placed several mm ahead of the nozzle, thereby successively ejecting particulated ink from the nozzle and giving information signals to the deflecting electrodes while the ejected inks fly between the deflecting electrodes, and also the system in which ink particles are ejected in accordance with the information signals without deflecting the ink particles, and both are effective for the present invention.

The second system is the system in which high pressure is applied on the ink by a small pump and minute ink particles are ejected forcibly by mechanical vibration of the nozzle by a quartz vibrator, etc., and the ink particles ejected are electrically charged corresponding to information signals simultaneously with ejection. The charged ink particles are deflected corresponding to the quantity of the charge during passage between the deflecting electrode plates. As another system utilizing this system, there is also the system called microdot ink jet system. According to this system, while the ink pressure and exciting conditions is maintained at adequate values within a certain ranges, two kinds of large and small ink droplets are generated from the nozzle tip, of which only the droplets with smaller sizes are utilized for recording. The specific feature of this system resides in that a group of minute liquid droplets can be obtained even with a thick nozzle aperture of the prior art.

The third system is the piezoelectric device system and, according to this system, a piezoelectric device is utilized in place of mechanical means such as pump in other systems as the means for pressurizing ink. This is the system, in which pressure is applied on the ink by the mechanical displacements created by giving electrical signals to the piezoelectric device, thereby ejecting the ink from a nozzle. It is also possible to use effectively the ink jet system as disclosed in Japanese Laid-open Patent Publication No. 59936/1979 in which the ink subjected to the action of heat energy undergoes abrupt change in volume and the ink is ejected from the nozzle through the acting force by such a change in state.

The above examples show preferable recording methods of the present invention, and the present invention is not limited to these recording methods, but it is of course useful for, for example, ink for use in other printers or writing implements.

The present invention is described in more detail by referring to the following examples, in which parts and % are by weight.

EXAMPLE 1

Compound No. 2 in Table 1            7 parts

-continued

| | | |
|---|---|---|
| Glycerin | 5 | parts |
| Polyethylene glycol 400 | 5 | parts |
| Ethylene glycol | 10 | parts |
| C.I. Direct Black 154 | 5 | parts |
| Nonionic surfactant [Emulgen PP-150 (trade mark), produced by Kao Sekken K.K.] | 0.1 | parts |
| Water | 68 | parts |

(Solubility of C.I. Direct Black 154 in compound No. 2 in Table 1 being 3.5%)

The above respective components were charged in a vessel, stirred for 5 hours and the resultant mixture was adjusted to pH 7.5 with 0.1 % aqueous sodium hydroxide.

Next, the mixture was filtered and a pressurization through Fluoropore filter [trade mark; produced by Sumitomo Denko K.K.] with a pore size of 0.45 μm to obtain a recording liquid A of the present invention. The physical properties, solubility and odor of the recording liquid A obtained were evaluated. The results are shown in Table 4.

The above recording liquid A was mounted on an ink jet printer (prototype machine produced by Canon K.K.) which performs recording by utilization of heat energy and printing was effected on continuous business forms and copying paper, and the recording characteristics with respective fixing characteristic and feathering ware evaluated.

Further, the machine was left to stand for 5 minutes without capping the printing head, and thereafter printing operation was again performed.

After 3 lines of printing was conducted, the power source of the printer was turned off and clogging of 24 nozzles was examined. The results are shown in Table 5.

EXAMPLES 2-6

| | Recording liquid B | | |
|---|---|---|---|
| (2) | Compound No. 4 in Table 1 | 4 | parts |
| | Triethylene glycol | 5 | parts |
| | Diethylene glycol | 10 | parts |
| | C.I. Food Black 2 | 6 | parts |
| | Water | 75 | parts |

(Solubility of C.I. Food Black 2 in Compound No. 4 in Table 1 being 1% or less)

| | Recording liquid C | | |
|---|---|---|---|
| (3) | Compound No. 11 in Table 1 | 3 | parts |
| | N-methyl-2-pyrrolidone | 10 | parts |
| | Polyethylene glycol | 15 | parts |
| | Hexylene glycol | 2 | parts |
| | Anionic surfactant [Caribon B (trade mark), produced by Sanyo Kasei K.K.] | 0.1 | parts |
| | C.I. Acid Red 8 | 4 | parts |
| | Water | 66 | parts |

(Solubility of C.I. Acid Red 8 in Compound No. 11 in Table 1 being 1% or less)

| | Recording liquid D | | |
|---|---|---|---|
| (4) | Compound No. 17 in Table 1 | 20 | parts |
| | Ethylene glycol | 10 | parts |
| | Nonionic surfactant [Nissan nonion K211 (trade mark), produced by Nippon Yushi K.K.] | 0.05 | parts |
| | C.I. Direct Blue 86 | 4 | parts |
| | Water | 66 | parts |

(solubility of C.I. Direct Blue 86 in compound No. 17 in Table 1 being 1.5%)

| | Recording liquid E | | |
|---|---|---|---|
| (5) | Compound No. 21 in Table 1 | 30 | parts |
| | C.I. Direct Blue 199 | 5 | parts |
| | Water | 65 | parts |

(Solubility of C.I. Direct Blue 199 in Compound No. 22 in Table 1 being 3.5%)

| | Recording liquid F | | |
|---|---|---|---|
| (6) | Compound No. 26 in Table 1 | 2 | parts |
| | Compound No. 5 in Table 1 | 5 | parts |
| | Glycerin | 10 | parts |
| | Ethyleneglycol | 10 | parts |
| | C.I. Direct Yellow 86 | 2 | parts |
| | C.I. Acid Yellow 23 | 2 | parts |
| | Water | 69 | parts |

(Solubility of C.I. Acid Yellow 23 in Compound No. 5 in Table 1 being 1% or less)

Example 1 was repeated except for using the above recording liquids B - F in plate of the recording liquid A in Example 1, and the recording liquids and recording characteristics were evaluated. The results are shown in Table 4 and Table 5.

TABLE 4

| Examples: Recording liquid | Surface tension (dyne/cm) | Viscosity (C.P.) | Solubility*1 | Odor*2 |
|---|---|---|---|---|
| (A) | 47.2 | 2.8 | ◯ | ◯ |
| (B) | 50.2 | 2.0 | ◯ | ◯ |
| (C) | 46.1 | 3.4 | ◯ | ◯ |
| (D) | 42.5 | 2.3 | ◯ | ◯ |
| (E) | 53.4 | 2.5 | ◯ | ◯ |
| (F) | 54.7 | 2.4 | ◯ | ◯ |

*1 Evaluation standards
◯ ... Ink completely homogenized.
x ... Separation of oily substance recognized.
*2 Evaluation standards
◯ ... Odorless or substantially insensible.
x ... Unpleasant feeling felt in office or home.

TABLE 5

| Examples: recording liquid | Fixing characteristic*3 | | Feathering ratio*4 | | Clogging*5 |
|---|---|---|---|---|---|
| | Fanfold paper | Copying paper | Fanfold paper | Copying paper | |
| (A) | ◯ | ⊚ | ◯ | ◯ | 0 |
| (B) | ⊚ | ⊚ | ◯ | ◯ | 0 |
| (C) | ◯ | ⊚ | ◯ | ◯ | 1 |
| (D) | ⊚ | ⊚ | ◯ | ◯ | 1 |
| (E) | ⊚ | ⊚ | ◯ | ◯ | 0 |
| (F) | ⊚ | ⊚ | ◯ | ◯ | 0 |

*3 10 seconds, 30 seconds after printing, the printed portion was rubbed with a filter paper (trade mark; No. 5C, produced by Toyo Kagaku Sangyo K.K.).
⊚ ... No smearing after 10 seconds
◯ ... Slight smearing after 10 seconds
Δ ... Slight smearing after 30 seconds
X ... Considerable smearing after 30 seconds
*4 The number of dots with feathering in 300 printed dots was evaluated in terms of percent.
◯ ... Less than 10% of feathering
Δ ... 10% to less than 20% of feathering
X ... 20% or more of feathering
*5 Number of nozzles causing clogging out of 24 nozzles.

For inks (C) and (D), clogging was cancelled by performing restoration operation.

EXAMPLES 7-11

The components shown below were stirred for 5 hours, and the resulting mixture was adjusted to pH 7.5 with a 0.1% aqueous sodium hydroxide and further filtered under pressurization through a membrane filter with a pore size of 0.45 μ (trade name, Fluoropore filter, produced by Sumitomo Denko K.K.) to provide the ink of the present invention.

| | Recording liquid G | | |
|---|---|---|---|
| (7) | Compound No. 21 in Table 2 | 15 | parts |
| | C.I. Direct Black 154 | 5 | parts |
| | Water | 80 | parts |

-continued (8)
- Compound No. 6 in Table 2 — 20 parts
- Compound No. 7 in Table 2 — 10 parts
- Glycerin — 5 parts
- C.I. Food Black 2 — 4 parts
- Water — 61 parts (Solubility of C.I. Food Black 2 in Compound No. 6 and 7 in Table 2 being 1% or less, and 1% or less, respectively)

Recording liquid I (9)
- Compound No. 27 in Table 2 — 8 parts
- Glycerin — 3 parts
- Tetraethylene glycol — 5 parts
- Ethylene glycol — 15 parts
- C.I. Acid Blue 254 — 3 parts
- Water — 66 parts (Solubility of C.I. Acid Blue 254 in Compound No. 27 in Table 2 being 1.5%)

Recording liquid J

(10)
- Compound No. 22 in Table 2 — 20 parts
- Triethylene glycol dimethyl ether — 10 parts
- Nonionic surfactant (trade name: Surfinol 104 produced by Nisshin Kogyo K.K.) — 0.1 parts
- Reactive dye (trade name: Kayaseron React Red CN-3B produced by Nippon Kayaku K.K.) — 4 parts
- Water — 66 parts (Solubility of Reaction dye in Compound No. 22 in Table 2 being 3.5%)

Recording liquid K

(11)
- Compound No. 20 in Table 2 — 6 parts
- Glycerin — 5 parts
- Polyethyleneglycol 300 — 10 parts
- C.I. Direct Yellow 86 — 2 parts
- C.I. Acid Yellow 23 — 2 parts
- Water — 75 parts (Solubility of C.I. Direct Yellow 86, C.I. Acid Yellow 23 in compound No. 20 in Table 2 being 2%, 1% or less)

Recording was performed in the same manner as Example 1 except for using the recording liquids G - J in place of the recording liquid A in Example 1, and the recording characteristics were evaluated. The results are shown in Tables 6 and 7.

TABLE 6

| Ink | Surface tension (dyne/cm) | Viscosity (C.P.) | Solubility |
|---|---|---|---|
| Recording liquid G | 43.4 | 3.1 | ○ |
| Recording liquid H | 48.3 | 3.3 | ○ |
| Recording liquid I | 45.2 | 2.9 | ○ |
| Recording liquid J | 33.6 | 3.5 | ○ |
| Recording liquid K | 43.4 | 3.1 | ○ |

TABLE 7

| Ink | Example 7 | 8 | 9 | 10 | 11 |
|---|---|---|---|---|---|
| Discharging stability*6 | ○ | ○ | ○ | ○ | ○ |
| Fixing characteristic*3 | | | | | |
| Continuous slip paper | ◉ | ○ | ◉ | ○ | ○ |
| Copying paper | ◉ | ◉ | ◉ | ◉ | ◉ |
| Feathering*4 | | | | | |
| Continuous slip paper | ○ | ○ | ○ | ○ | ○ |
| Copying paper | ○ | ○ | ○ | ○ | ○ |

TABLE 7-continued

| Ink | Example 7 | 8 | 9 | 10 | 11 |
|---|---|---|---|---|---|
| Clogging*5 | 0 | 1 | 0 | 1 | 0 |

*6Evaluation standards for the dot constitution of a portion of a printed alphabet letter observed through a magnifying glass.
○... No disturbance observed in dot constitution.
x... Disturbance observed or satellite dots occurred in dot constitution.

*6 Evaluation standards for the dot constitution of a portion of a printed alphabet letter observed through a magnifying glass.
 o ... No disturbance observed in dot constitution.
 x ... Disturbance observed or satellite dots occurred in dot constitution.

EXAMPLES 12–16

The components shown below were stirred for 5 hours, and the resulting mixture was adjusted to pH 7.5 with a 0.1% aqueous sodium hydroxide and further filtered under pressurization through a membrane filter with a pore size of 0.45 $\mu$ (trade name, Fluoropore filter, produced by Sumitomo Denko K.K.) to provide the ink of the present invention.

Recording liquid L

(12)
- Compound No. 6 in Table 3 — 20 parts
- C.I. Direct Black 154 — 5 parts
- Water — 75 parts (Solubility of C.I. Direct Black in Compound No. 6 in Table 3 being 4.5%)

Recording liquid M

(13)
- Compound No. 3 in Table 3 — 20 parts
- Compound No. 7 in Table 3 — 10 parts
- Glycerin — 5 parts
- C.I. Food Black 2 — 4 parts
- Water — 61 parts (Solubility of C.I. Food Black in Compound No. 3, No. 7 in Table 3 being 3%, 4.5%, respectively)

Recording liquid N

(14)
- Compound No. 10 in Table 3 — 8 parts
- Glycerin — 3 parts
- Tetraethylene glycol — 5 parts
- Ethylene glycol — 15 parts
- C.I. Acid Blue 254 — 3 parts
- Water — 66 parts (Solubility of C.I. Acid Red 254 in compound No. 10 in Table 3 being 1%)

Recording liquid O

(15)
- Compound No. 21 in Table 3 — 20 parts
- Triethylene glycol dimethyl ether — 10 parts
- Nonionic surfactant (trade name: Surfinol 104 produced by Nisshin Kagaku Kogyo K.K.) — 0.1 parts
- C.I. Reactive Red 221 — 4 parts
- Water — 66 parts (Solubility of C.I. Reactive Red 221 in compound No. 21 in Table 3 being 1%)

Recording liquid P

(16)
- Compound No. 2 in Table 3 — 6 parts
- Glycerin — 5 parts
- Polyethyleneglycol 300 — 10 parts
- C.I. Direct Yellow 86 — 2 parts
- C I. Acid Yellow 23 — 2 parts
- Water — 75 parts (Solubility of C.I. Direct Yellow 23, C.I. Acid Yellow 23 in Compound No. 2 in Table 3 being 4.5%, 2%, respectively)

Recording was performed in the same manner as Example 1 except for using the recording liquids L - P in place of the recording liquid A in Example 1, and the recording characteristics were evaluated. The results are shown in Tables 8 and 9.

TABLE 8

| Ink | Surface tension (dyne/cm) | Viscosity (C.P.) | Solubility |
|---|---|---|---|
| Recording liquid L | 43.6 | 2.8 | ◯ |
| Recording liquid M | 41.0 | 3.5 | ◯ |
| Recording liquid N | 46.3 | 2.5 | ◯ |
| Recording liquid O | 33.6 | 2.5 | ◯ |
| Recording liquid P | 52.4 | 2.3 | ◯ |

TABLE 9

| Ink | Example 12 | 13 | 14 | 15 | 16 | 6 |
|---|---|---|---|---|---|---|
| Discharging stability*6 | ◯ | ◯ | ◯ | ◯ | ◯ | X |
| Fixing characteristic*3 | | | | | | |
| Continous business form | ⊚ | ◯ | ⊚ | ◯ | ◯ | X |
| Copying paper | ⊚ | ⊚ | ⊚ | ⊚ | ⊚ | Δ |
| Feathering*4 | | | | | | |
| Continuous business form | ◯ | ◯ | ◯ | ◯ | ◯ | ◯ |
| Copying paper | ◯ | ◯ | ◯ | ◯ | ◯ | ◯ |
| Clogging*5 | 0 | 0 | 0 | 1 | 1 | 10 |

We claim:

1. A recording method comprising the steps of: jetting liquid droplets of an aqueous recording liquid onto a recording medium subjected to sizing and having fibers exposed on a surface thereof, wherein said aqueous recording liquid comprises 1 to 10% by weight of a water-soluble dye, at least 61% by weight of water, and at least one of the compounds represented by formulae (I), (II) or (III) below, wherein, if selected, said compound (I) is contained in said recording liquid within a range of 2 to 30% by weight, and said compounds (II) or (III) are contained within a range of 6 to 30% by weight based on the total weight of the recording liquid:

$$R_1O-(C_2H_4O)_m-R_2 \qquad (I)$$

$$HO-(C_2H_4O)_a(C_3H_6O)_b(C_2H_4O)_cH \qquad (II)$$

$$(R_3)(R_4)Ph-O-(C_2H_4O)_nH \qquad (III)$$

wherein $R_1$ and $R_2$ are independently $C_{1-6}$ alkyl or $C_8$ or less aryl, m is from 3 to 20, a+c are at most 78, b is from 2 to 15, $R_3$ and $R_4$ are independently hydrogen or a $C_1$ or 2 alkyl, and n is from 4 to 20.

2. A recording method according to claim 1, wherein said recording liquid further comprises a polyhydric alcohol or a lower alkyl ether of a polyhydric alcohol.

3. A recording method according to claim 1, wherein said recording liquid comprises a compound represented by the general formula (I) in an amount of 2 to 30% by weight based on the total weight of the recording liquid.

4. A recording method according to claim 1, wherein said recording liquid comprises a compound represented by the general formula (II) in an amount of 6 to 30% by weight based on the total weight of the recording liquid.

5. A recording method according to claim 1, wherein said recording liquid comprises a recording liquid represented by the general formula (III) in an amount of 6 to 30% by weight based on the total weight of the recording liquid.

6. A recording method according to claim 1, wherein said compound of formula (I) is selected from the group consisting of:

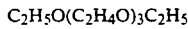
$C_2H_5O(C_2H_4O)_3C_2H_5$

$C_4H_9O(C_2H_4O)_3CH_3$

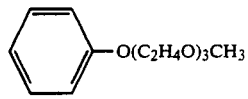
$-O(C_2H_4O)_3CH_3$

$C_3H_7O(C_2H_4O)_5C_3H_7$

$C_3H_7O(C_2H_4O)_7C_3H_7$

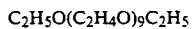
$C_2H_5O(C_2H_4O)_9C_2H_5$

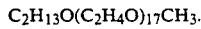
$C_2H_{13}O(C_2H_4O)_{17}CH_3$.

7. A recording method according to claim 1, wherein said compound represented by formula (II) is selected from the group consisting of:

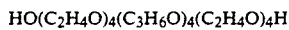
$HO(C_2H_4O)_4(C_3H_6O)_4(C_2H_4O)_4H$

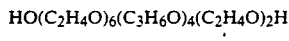
$HO(C_2H_4O)_6(C_3H_6O)_4(C_2H_4O)_2H$

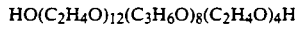
$HO(C_2H_4O)_{12}(C_3H_6O)_8(C_2H_4O)_4H$

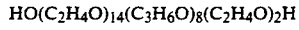
$HO(C_2H_4O)_{14}(C_3H_6O)_8(C_2H_4O)_2H$

$HO(C_2H_4O)_{39}(C_3H_6O)_8(C_2H_4O)_2H$,

$HO(C_2H_4O)_{20}(C_3H_6O)_{12}(C_2H_4O)_4H$

8. A recording method according to claim 1, wherein said compound of formula (III) is selected from the group consisting of:

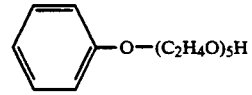
$-O-(C_2H_4O)_5H$

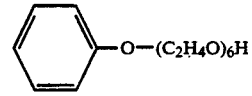
$-O-(C_2H_4O)_6H$

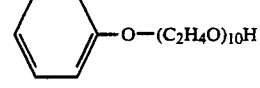
$-O-(C_2H_4O)_{10}H$

-continued
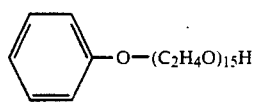
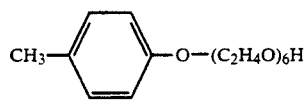
-continued
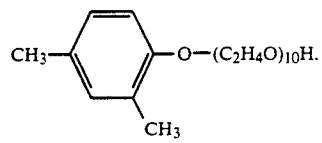
9. A recording method according to claim 1, including the steps of applying heat energy to said recording liquid to form a droplet, and applying said droplet to a recording material to carry out recording.
* * * * *

UNITED STATES PATENT AND TRADEMARK OFFICE
CERTIFICATE OF CORRECTION

PATENT NO. : 5,099,255
DATED : March 24, 1992
INVENTOR(S) : Koike et al.

It is certified that error appears in the above-identified patent and that said Letters Patent is hereby corrected as shown below:

COLUMN 1:

Line 46, "o0" should read --on--.

COLUMN 2:

Line 20, "ma" should read --may--.

Line 64, "recording" (second occurrence) should be deleted.

COLUMN 4:

Line 16, "include" should read --include:--.

Line 27, "112," should read --112, 118;--.

COLUMN 8:

Line 63, "solvents." should read --solvents,--.

UNITED STATES PATENT AND TRADEMARK OFFICE
CERTIFICATE OF CORRECTION

PATENT NO. : 5,099,255
DATED : March 24, 1992
INVENTOR(S) : Koike et al.

It is certified that error appears in the above-identified patent and that said Letters Patent is hereby corrected as shown below:

COLUMN 9:

Line 3, "5" should be deleted.

COLUMN 12:

Line 13, "plate" should read --place--.

COLUMN 14:

Lines 10-15 should be deleted.

Signed and Sealed this

Sixth Day of July, 1993

Attest:

MICHAEL K. KIRK

Attesting Officer

Acting Commissioner of Patents and Trademarks